United States Patent [19]
Harrower

[11] 3,914,773
[45] Oct. 21, 1975

[54] RECORDING DEVICE
[76] Inventor: Harold W. Harrower, Box P, Chepachet, R.I. 02814
[22] Filed: Apr. 5, 1974
[21] Appl. No.: 458,296

[52] U.S. Cl. ............ 346/121; 346/33 ME; 346/137
[51] Int. Cl.² ........................................... G01D 9/14
[58] Field of Search .... 346/33 ME, 33 A, 112, 121, 346/134, 137; 128/2 G; 356/39; 235/151.35; 23/253 R, 230 B

[56] References Cited
UNITED STATES PATENTS

| | | |
|---|---|---|
| 1,069,594 | 8/1913 | Wurmb et al. ...................... 346/137 |
| 2,074,116 | 3/1937 | Stein ............................... 346/137 X |
| 2,702,736 | 2/1955 | Niemann ......................... 346/112 X |
| 3,064,261 | 11/1962 | Maeder ............................... 346/137 |

*Primary Examiner*—Joseph W. Hartary
*Attorney, Agent, or Firm*—Richard J. Birch

[57] ABSTRACT

A recording device for rectilinear recording on a circular chart in a programmed time sequence at different speeds. In the preferred embodiment, the recording device provides circular chart recording of blood coagulation, lysis and aggregation. A time base is printed circumferentially on each circular chart to permit a direct readout of time. Amplitude is read directly from the chart in terms of radial distance.

4 Claims, 9 Drawing Figures

RECORDING DEVICE

BACKGROUND OF THE INVENTION

The present invention relates to recording devices in general, and more particularly, to a device in which circular recording occurs in a pre-programmed time sequence with a rectilinear display of the recorded information.

Circular chart recording devices for curvilinear recording of a variety of different types of information are known in the art. Representative examples of such devices include the following U.S. Pat. Nos.: 205,844 issued July 9, 1878 to H. Dorpmuller for Speed-Recorder; 2,685,493, issued Aug. 3, 1954, to D. T. McDonald et al. for Intermittent Chart Recording Instrument; 3,084,014, issued Apr. 2, 1963 to E. W. Molloy for Pen Drive For Recorders And The Like; 3,132,917, issued May 12, 1964 to T. R. Folsonn et al. for Delayed Starting And Stopping Device For Chart Recorder; and, 3,341,851, issued Sept. 12, 1967 to B. A. Tracey et al. for Deceleration Recorder And/Or Signaler.

The prior art circular chart recorders have not been employed generally in the medical instrumentation field and specifically in instrumentation for recording tests of blood coagulation, fibrinolysis, platelet aggregation and other related phenomena. The use of the prior art curvilinear recording devices in blood testing instrumentation would not produce a significant improvement over existing recording systems because of the inherent limitations of the curvilinear prior art devices.

It is accordingly a general object of the invention to provide an improved circular recording device which provides a rectilinear display of the recorded information.

It is a specific object of the present invention to provide a circular recording device having a pre-programmed time sequence for recording information on a circular chart with a rectilinear display of the recorded information.

It is another object of the invention to provide a pre-programmed speed circular recording device which provides a direct time readout of the recorded information.

It is a feature of the invention that the need for time markers on the recording is eliminated.

It is another feature of the invention that multiple recordings can be made on the same circular chart.

It is still another feature of the invention that a broad range of blood tests relating to coagulation, lysis and aggregation can be performed and recorded by a single device.

These objects and features of the invention will best be understood from a detailed description of a preferred embodiment thereof selected for purposes of illustration and shown in the accompanying drawings, in which.

Figure 1:
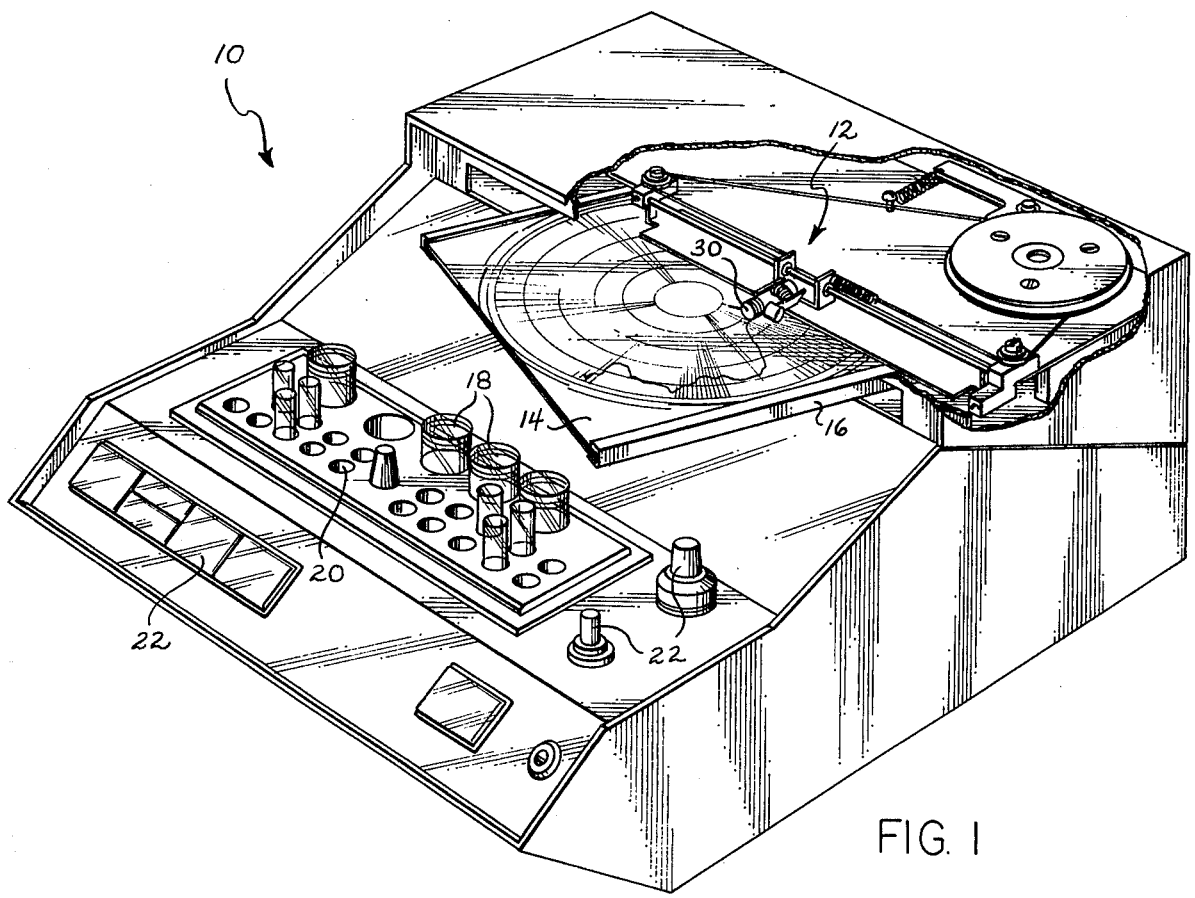
FIG. 1 is a view in perspective of a blood testing apparatus which incorporates the recording device of the present invention.

Turning now to the drawings, there is shown a recording device constructed in accordance with the present invention and indicated generally by the reference numeral 10. FIG. 1 illustrates, in perspective view, the preferred embodiment of the invention in which the recording device provides a circular chart recording of blood coagulation, lysis and aggregation with direct, rectilinear readout. The recording device 10 has a conventional, bridge photo-cell, servo driven recording system 12 which responds to the light transmitted through a blood sample (not shown). The recording system 12 provides a rectilinear recording on a circular chart 14 which is removably held within a rotatable, spring-loaded platen 16. A plurality of sample cuvets 18 are positioned within instrument holders 20. Suitable controls 22 are provided on the recording devivce 10 for providing conventional control functions such as, zeroing the recording system against a known standard, manually starting the recording sequence and resetting the recording chart to zero. Normally, the servo driven recording system 12 is balanced against a light transmission standard as is well known in the blood analysis art.

Figure 2:
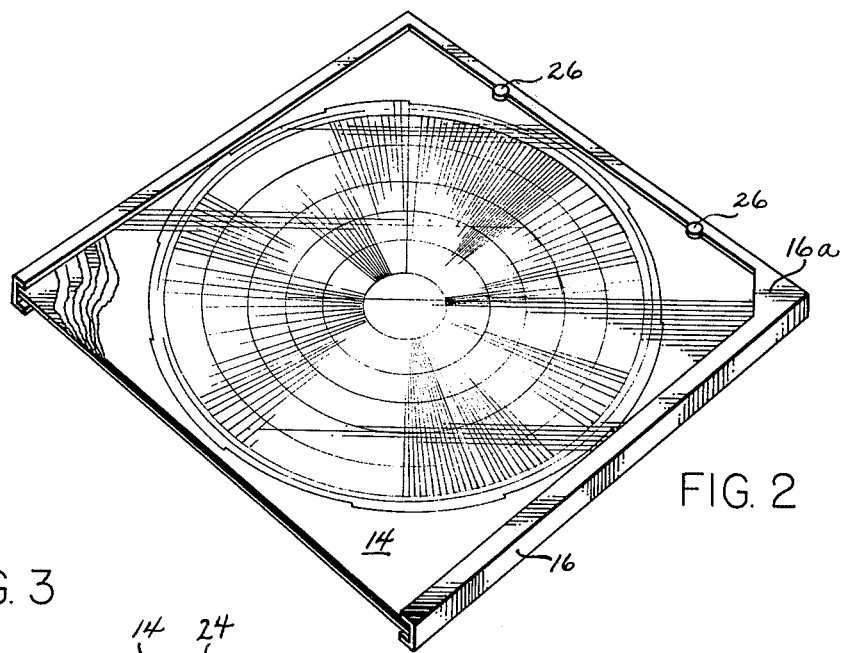
FIG. 2 is a view in perspective of a spring loaded platen for holding one or more circular charts.
Figure 3:
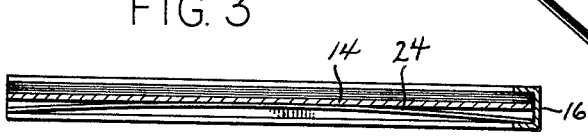
FIG. 3 is a view in cross section of the springloaded platen of FIG. 2 illustrating the spring positioning of a chart.
Figure 4:
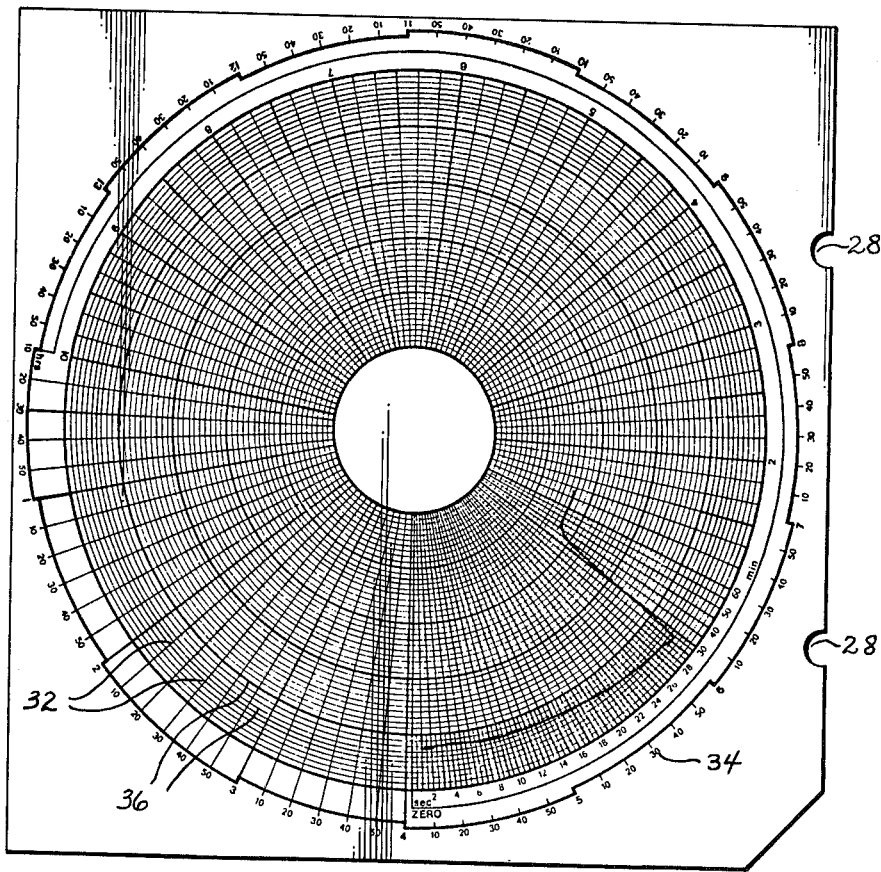
FIG. 4 is a plan view of a circular recording chart and base depicting a test trace, a circumferentially positioned time base and radially spaced amplitude scales.

Looking now at FIGS. 2, 3 and 4, each circular recording chart 14 is held within the chart platen 16 by means of a spring 24. Preferably, a plurality of charts 14 is positioned within platen 16, as shown in FIG. 2, and accurately located therein by means of two chart locating pins 26 which engage corresponding chart notches 28. In addition, the platen 16 can be provided with a chamfered corner 16a which engages a corresponding chamfered edge 14a of the chart 14.

The recording system 12 includes a recording element such as a pen 30 which is shown in FIG. 1. The recording pen 30 produces a permanent recording on the circular chart 14 in a rectilinear format as the chart rotates during the recording cycle. FIG. 4 illustrates a sample trace on the circular recording chart 14. The chart has a plurality of radial markings 32 which define circumferentially spaced, predetermined chart recording time intervals. A corresponding plurality of radially spaced, circumferential lines 36 is provided to indicate the amplitude of the recorded signal. It can be seen that the radial markings 32 define a first recording time period of one to 30 seconds, a second recording period of 9½ minutes and a third recording period of 18 hours. During each of these recording periods, the circular chart 14 is rotated about its axis at three different, programmed recording speeds. The drive system for producing the three recording speeds will be discussed below in connection with FIG. 9.

Figure 6:
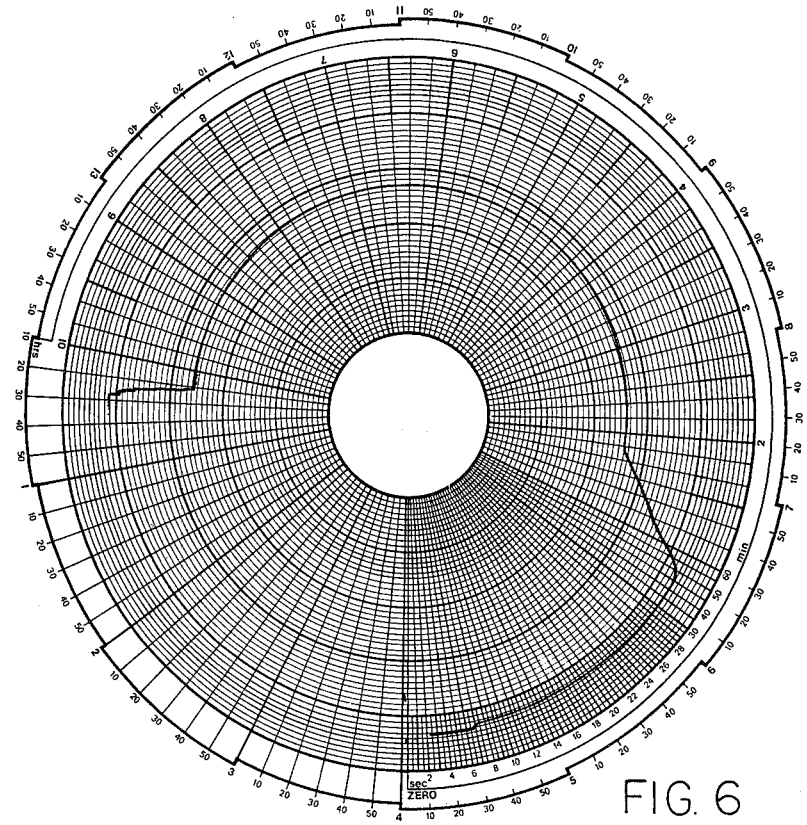
FIG. 6 is a view of a circular recording chart showing a chart trace for clotting and lysis times.
Figure 5:
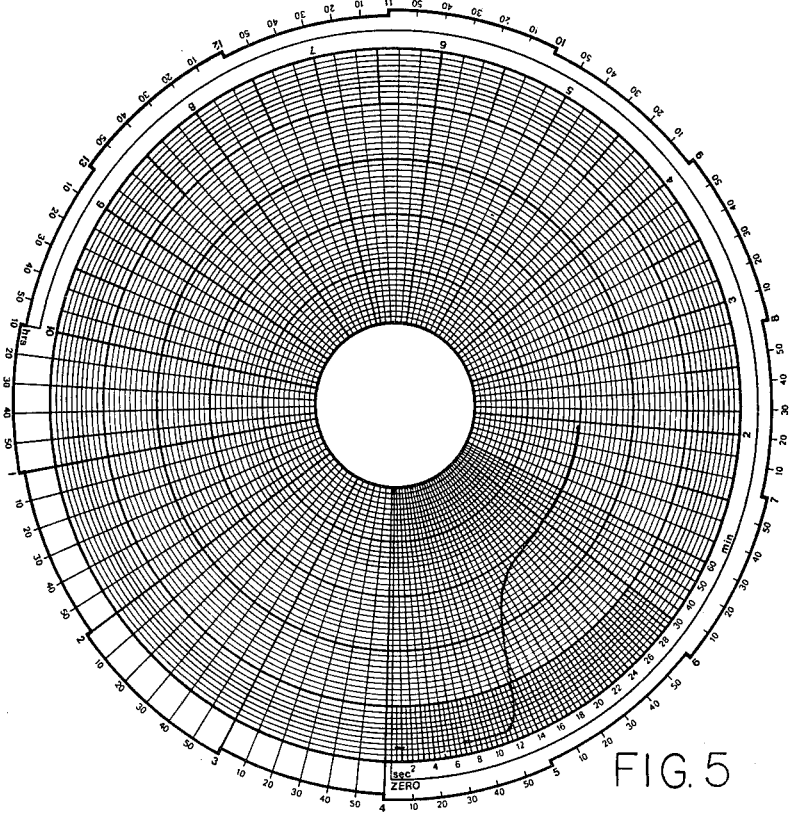
FIG. 5 is a view of a circular recording chart showing a chart trace for Prothrombin time.
Figure 7:
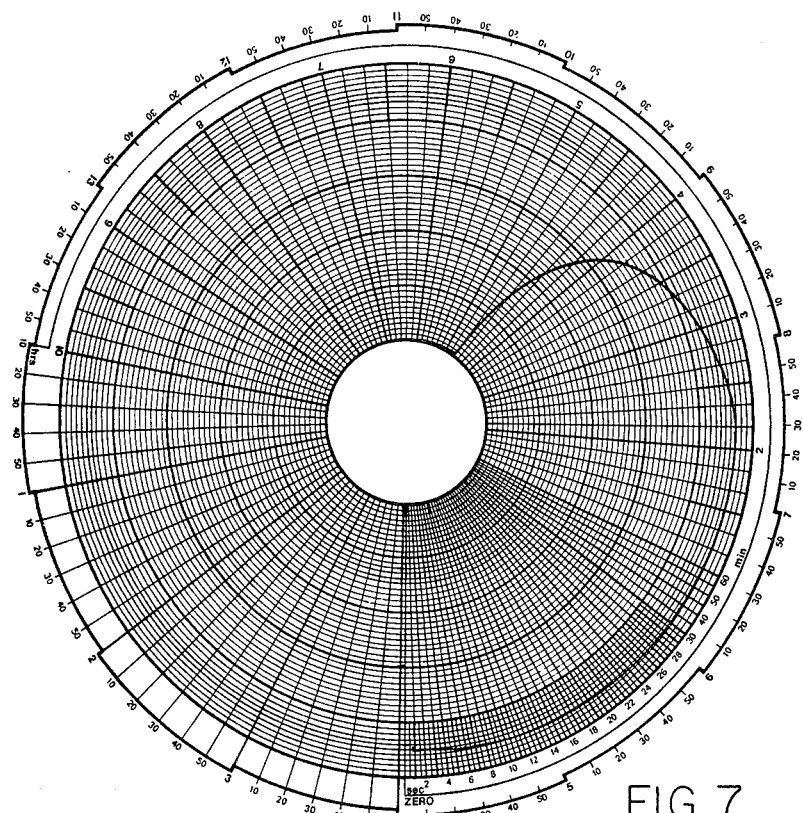
FIG. 7 is a view of a circular recording chart showing a chart trace for recalcified plasma clotting time.
Figure 8:
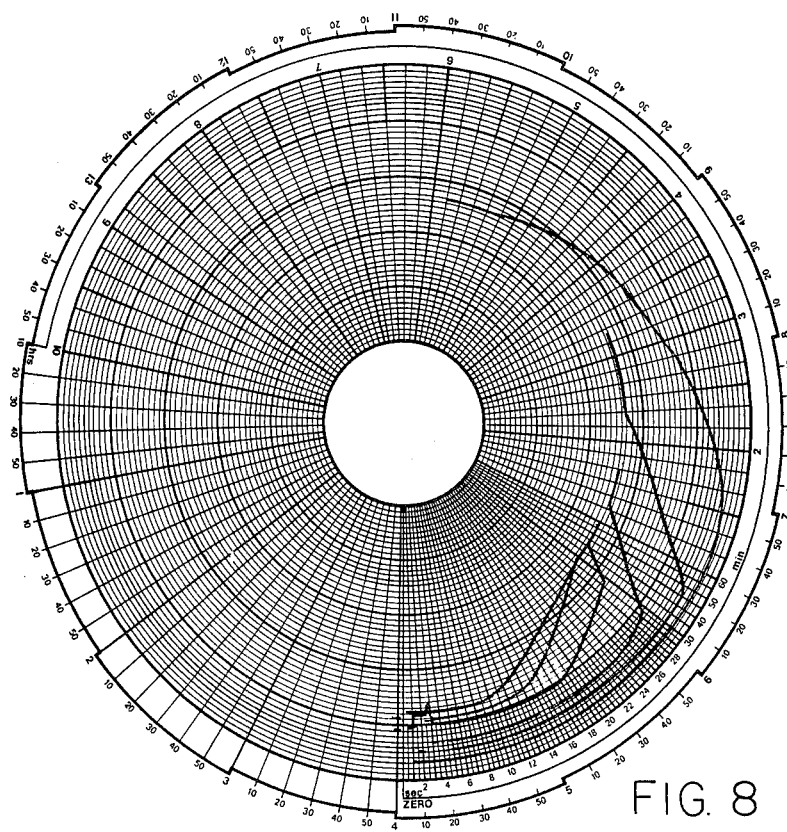
FIG. 8 is a view of a circular recording chart showing a chart trace for Fibrinogen with serial dilutions of Thrombin; and, FIG. 9 is a diagrammatic view in partial block form of the electrical circuitry of the blood testing apparatus of FIG. 1.

FIGS. 4 through 8 illustrate various types of chart traces which can be recorded on circular chart 14 with a direct rectilinear readout. FIG. 4 depicts a chart trace for partial thromboplastin with a time of 29.5 seconds. FIG. 5 shows the circular recording chart trace for prothrombin time, FIG. 6 illustrates the chart trace for clotting and lysis time, FIG. 7 shows the chart trace for recalcified plasma clotting time and, finally, FIG. 8 illustrates the chart trace for fibrinogen with serial dilutions of thrombin.

Figure 9:
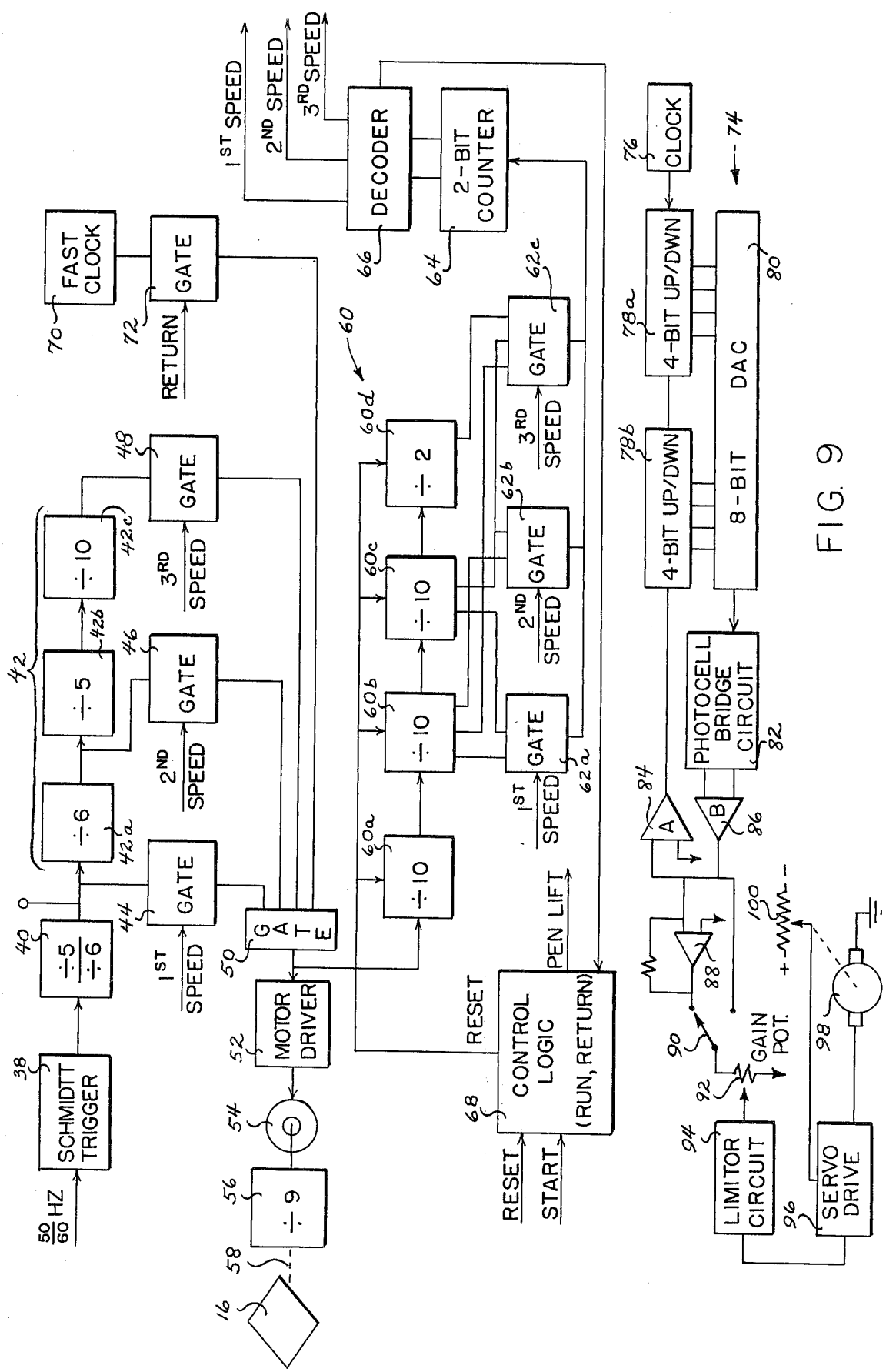

Looking now at FIG. 9, there is shown in diagrammatic and block form the drive system for driving chart platen 16 with chart 14 held therein at a plurality of different, programmed chart speeds. Referring to the upper portion of FIG. 9, a power line source of 50/60 hertz is applied to a schmidtt trigger 38 which produces a corresponding plurality of output pulses. A divide-by-5//divide-by-6 circuit 40 divides down the output pulses from schmidtt trigger 38 to provide a corresponding 10 Hz output signal. The 10 Hz signal is applied to a divider chain 42 comprising divide-by-6, divide-by-5 and divide-by-10 stages 42a, 42b and 42c, respectively. Three speed control gates 44, 46 and 48 are employed to gate the powerline divided pulses to OR gate 50. The pulses from gate 50 are applied to motor driver 52 which in turn drives a stepper motor 54. The stepper motor output is mechanically divided by a divide-by-9 gear train 56, the output of which is mechanically coupled through coupling 58 to the chart platen 16.

Assuming that the stepper motor 56 steps 1.8° per step, the divide-by-9 gear train 56 will convert each stepper motor step into a 0.2° step which is coupled through mechanical coupling 58 to platen 16. Thus, given a 10 Hz input through gates 44 and 50 to motor driver 52, the platen 16 and the chart 14 will rotate 60° during the first 30 seconds. The 30 second recording period can be seen from an inspection of FIG. 4. A similar analysis obtains for the second and third speeds which provide rotation of the chart 14 in increments of one third of a degreee per second for the second speed and 150th of a degree per second for the third speed.

Enabling pulses for the first, second and third speed gates 44, 46 and 48, respectively, are obtained from a divider chain 60 comprising three divide-by-10 circuits 60a, 60b and 60c and a divide-by-2 circuit 60d. The outputs of these divider circuits are applied through first, second and third speed AND gates 62a, 62b and 62c to a 2-bit counter 64. The count state of the 2-bit counter 64 is decoded by decoder 66 to provide first, second and third speed signals.

Control of the recording device is provided by a control logic circuit 68 which, in response to manual or automatically generated "start" and "reset" signals, generates corresponding control signals to run the recording device 12. In order to return the recording pen 30 to the zero position on the recording chart, a return circuit is employed. The return circuit utilizes a fast clock source 70 which is gated through gate 72 directly to the motor driver gate 50. The fast clock pulses step the stepper motor 54 at a sufficient rate to return the chart to the zero position in a short period of time.

The circuitry for the servo driven bridge recorder 12 is illustrated in the lower portion of FIG. 9 in block form and indicated generally by the reference numeral 74. A separate clock source 76 produces clock pulses for a pair of 4-bit up/down counters 78a and 78b the outputs of which are coupled to a 8-bit digital-to-analog converter 80. The output from DAC 80 is applied to a standard photocell bridge circuit 82. An op amp 84 is employed to provide an automatic zeroing function by driving the up/down counter in an appropriate direction to keep the output of amplifier 86 at a predetermined level, i.e., zero or zero plus an offset.

Amplifier 88 is used as an inverter and is coupled to a single-pole, two position switch 90. In the upper position, as shown in FIG. 9, switch 90 is in the "Aggregation" mode for the recording device. When the switch is moved to the lower position the recording device is in the "Coagulation" mode. Gain of the recording system is controlled by a gain pot 92 which preferably is a user adjustable potentiometer. A limiter circuit 94, servo drive 96, servo motor 98 and the servo reference voltage source 100 complete the recording portion of the instrumentation.

Having described in detail a preferred embodiment of my invention, it will be appreciated that the recording device provides significant advantages over existing recording apparatus. Since my circular recording device produces a direct rectilinear recording on a circular chart, it can be seen that a number of separate and distinct recordings can be made on the same chart. For example, a plurality of different tests results for one patient can be recorded on a single chart with the appropriate patient identification information. Similarly, the results of the same test, but recorded at different times, can be displayed on the single patient chart. Furthermore, multiple rotations of one circular chart can be employed to display different test results.

It will be appreciated by those skilled in the art that numerous modifications can be made to my invention without departing from the scope thereof as defined in the appended claims.

What I claim and desire to secure by Letters Patent of the United States is:

1. A recording device comprising:
   rotatable circular chart means having a plurality of circumferentially spaced, radially extending lines which define circumferentially spaced recording time increments and a plurality of radially spaced circumferential lines which define by radial spacing a plurality of recording amplitude increments;
   means for rotating said rotatable circular chart means at predetermined different rotational speeds which occur in the sequence fast, slow and slower from the commencement of recording; and,
   means for producing a recording trace on said circular chart means in response to an input signal during rotation of said chart means whereby rectilinear recording of a time/amplitude variable signal is provided on said circular chart means.

2. The apparatus of claim 1 wherein said circumferentially spaced recording time increments have associated time indices which correspond to said predetermined, different rotational speeds.

3. The apparatus of claim 1 wherein said means for rotating said chart means includes a spring-loaded platen having means for accurately positioning said circular chart means.

4. The apparatus of claim 3 wherein said circular chart means comprises a plurality of superposed, rectangular elements each having formed thereon a circular chart which has a plurality of circumferentially spaced, radially extending lines which define circumferentially spaced recording time increments and a plurality of radially spaced, circumferential lines which define a plurality of recording amplitude increments.

* * * * *